US011843567B2

(12) United States Patent
Balaji et al.

(10) Patent No.: US 11,843,567 B2
(45) Date of Patent: Dec. 12, 2023

(54) SHARED REACTIONS WITHIN A VIDEO COMMUNICATION SESSION

(71) Applicant: Zoom Video Communications, Inc., San Jose, CA (US)

(72) Inventors: Abhishek Balaji, San Jose, CA (US); Oded Gal, Palo Alto, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/246,566

(22) Filed: Apr. 30, 2021

(65) Prior Publication Data

US 2022/0353220 A1 Nov. 3, 2022

(51) Int. Cl.
| G06F 15/16 | (2006.01) |
| H04L 51/10 | (2022.01) |
| G06F 3/04812 | (2022.01) |
| H04L 51/04 | (2022.01) |
| H04L 12/18 | (2006.01) |
| H04N 7/15 | (2006.01) |
| G06F 3/04842 | (2022.01) |

(52) U.S. Cl.
CPC .......... H04L 51/10 (2013.01); G06F 3/04812 (2013.01); G06F 3/04842 (2013.01); H04L 12/1822 (2013.01); H04L 12/1831 (2013.01); H04L 51/04 (2013.01); H04N 7/152 (2013.01)

(58) Field of Classification Search
None
See application file for complete search history.

(56) References Cited

U.S. PATENT DOCUMENTS

| 9,691,412 | B2* | 6/2017 | Totzke | H04N 7/152 |
| 10,250,851 | B1* | 4/2019 | Harpur | G06V 40/174 |
| 10,536,542 | B1* | 1/2020 | Dorner | H04L 51/52 |
| 11,381,411 | B1* | 7/2022 | Gale | H04L 65/4015 |
| 2010/0153497 | A1* | 6/2010 | Sylvain | H04N 7/15 |
| | | | | 709/204 |
| 2014/0253672 | A1* | 9/2014 | Bank | G06Q 10/10 |
| | | | | 348/14.08 |
| 2018/0157388 | A1* | 6/2018 | Gleason | H04L 65/403 |

(Continued)

FOREIGN PATENT DOCUMENTS

WO WO-2019008320 A1 * 1/2019 ............ G06Q 10/06

*Primary Examiner* — Yves Dalencourt
(74) *Attorney, Agent, or Firm* — Young Basile Hanlon & MacFarlane, P.C.

(57) ABSTRACT

Methods and systems provide for the ability to display reactions within a video communication session. First, the system displays, for each of a number of participants within a video communication session, a user interface (UI), with the UI including a reactions session with a variety of selectable visual reactions, a number of participant windows corresponding to participants, and videos of at least a subset of the participants which are displayed within the participant windows. The system receives a selection of a reaction via a video client device connected to the video communication session, where the client device is associated with one of the participants. The system then displays the selected reaction within the UI of at least one of the participants within the corresponding participant windows for a predetermined period of time. Aggregate reactions may be displayed when a number of participants select the same reaction.

20 Claims, 12 Drawing Sheets

(56) References Cited

U.S. PATENT DOCUMENTS

| | | | |
|---|---|---|---|
| 2021/0076002 A1* | 3/2021 | Peters | H04N 7/152 |
| 2021/0400142 A1* | 12/2021 | Jorasch | H04M 3/567 |
| 2022/0038580 A1* | 2/2022 | Li | H04L 65/4015 |
| 2022/0141532 A1* | 5/2022 | Li | H04N 21/44222 |
| | | | 725/14 |

* cited by examiner

Aggregate Reactions Within a
Video Communication Session

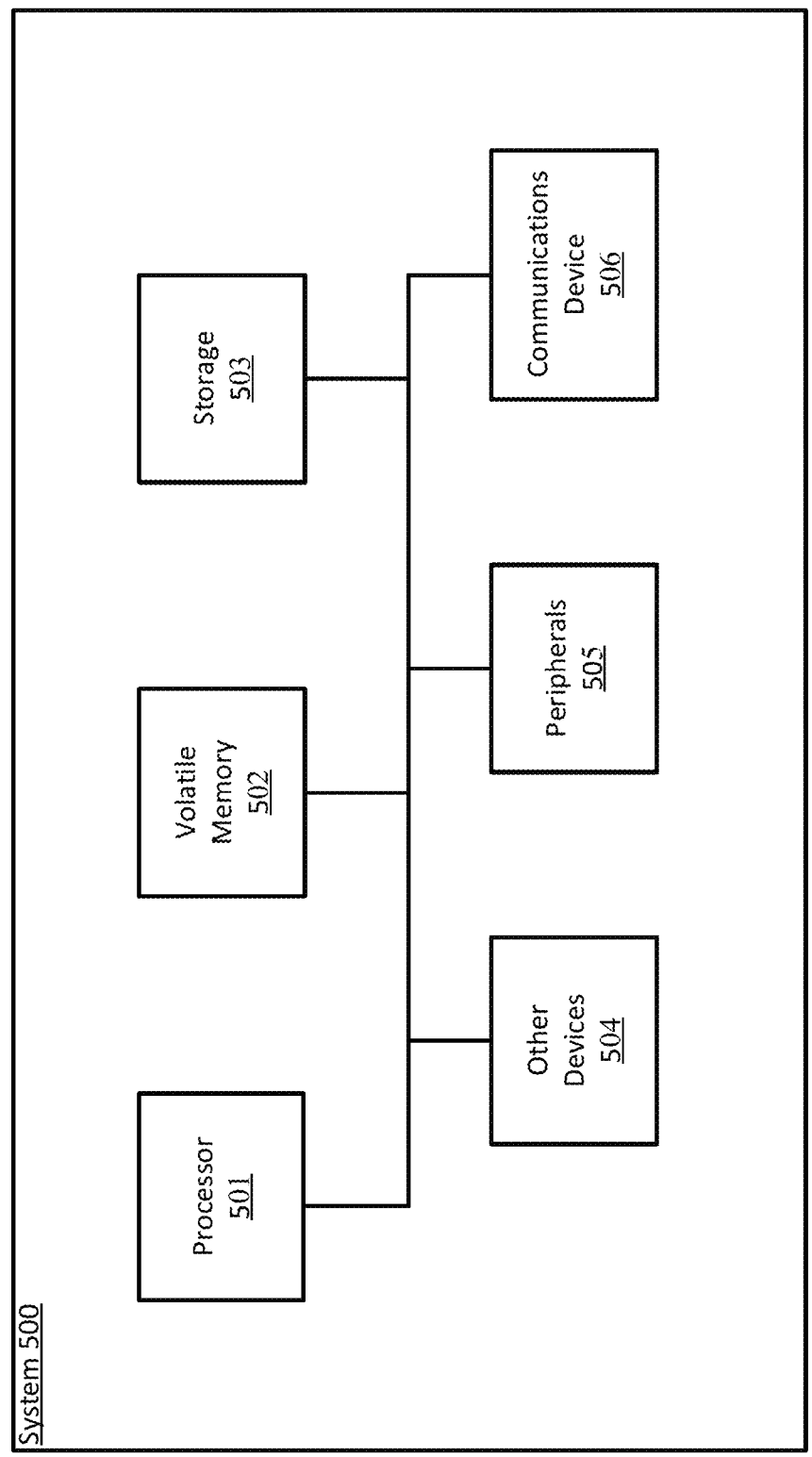

SHARED REACTIONS WITHIN A VIDEO COMMUNICATION SESSION

FIELD OF INVENTION

The present invention relates generally to digital communication, and more particularly, to systems and methods providing for the sharing of visual reactions within a video communication session.

BACKGROUND

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

One of the side effects of such virtual, remote meetings via video communication sessions is that videos of participants within a group session may not as easily translate the reactions of those participants to the conversation, due to the nature of windows of participants being split across the available space of a screen. Participants may also want to share reactions to the conversation without having video enabled, or may want to share reactions for a presenter to see during a presentation without needing to speak and interrupt that presenter. Participants may also want to emphasize a particular reaction as a fun way to express themselves, in the same way that many enjoy using emojis on messaging services.

Within some video livestreaming services, users watching the livestream may be able to share reactions during a livestream. For example, during a livestream, a chat messaging window is displayed alongside the streaming content. Someone participating in the chat may react to content and select a reaction, which is then displayed. A record of that reaction is made, and the reaction is displayed during all future playbacks of the livestream. This works within the one-to-many nature of livestreaming content, where reactions can be displayed within or next to chat messages which appear alongside the video content. However, solutions for many-to-many interactions, such as are typical in group meetings and video sessions with multiple participants, are lacking. Rather than the chat experience and emotions surrounding it during a livestream, there is no way of sharing reactions during a group video sessions in order to express ephemeral emotions during a live conversation between participants.

In addition, there is no solution for a large number of people expressing reactions simultaneously during a many-to-many video session. While a presenter is speaking, for example, others may be quiet or have their video feeds disabled, and thus there is often a lack of immediate reaction from the audience to the presenter, which can make the presenter feel that the audience is unreceptive or bored.

Thus, there is a need in the field of digital communication tools and platforms to create a new and useful system and method for sharing reactions within a video communication session. The source of the problem, as discovered by the inventors, is a lack of ability for participants to communicate visual reactions quickly in live group conversations.

SUMMARY

The invention overcomes the existing problems by enabling the ability for participants within a video communication session to share visual reactions to the conversation. Such reactions may be able to create little expressions of joy, intimacy, or connection in order to best capture that particular moment's experience. For example, a family may be able to meet virtually via a remote video communication session on a platform. During this special moment, reactions depicting a heart may be used by the family members to express love. This heightens the feeling of intimacy between the family members during that session. During professional meetings, reactions might be used to silently confirm or support various points a participant is making without interrupting them, or may be used to add some much-needed levity and fun to an otherwise serious meeting. For example, when a 30-minute break is announced during a webinar session, participants may react with a "party" visual reaction to keep things light-hearted, or to segue into potential networking or light chatting between participants.

In some embodiments, during group meetings with sometimes dozens or even hundreds of participants in a many-to-many video session, it may be beneficial to express aggregated reactions overall within the session which are culled from many individual reactions from participants. For example, when a speaker is presenting, it may be useful feedback to receive an aggregated reaction depicting hundreds of hearts, so that the speaker knows the audience is supportive and keeping interested, or hundreds of laugh reactions to show that a joke was received well.

One embodiment relates to a communication system configured to perform a number of operations. First, the system displays, for each of a number of participants within a video communication session, a user interface (UI), with the UI including a reactions session with a variety of selectable visual reactions, a number of participant windows corresponding to participants, and videos of at least a subset of the participants which are displayed within the participant windows. The system receives a selection of a reaction from the variety of reactions via a video client device connected to the video communication session, where the client device is associated with one of the participants. The system then displays the selected reaction within the UI of at least one of the participants within the corresponding participant windows for a predetermined period of time.

In some embodiments, the system receives one or more additional selections of the reaction from client devices associated with additional participants. The system then aggregates the selection and the additional selections of the reaction, and determines whether a threshold number of selections has been met or exceeded to display an aggregate reaction. If the threshold has been met or exceeded, then the system displays an aggregate reaction, wherein the selected reaction is displayed within the UI as the aggregate reaction representing the reactions of multiple participants within the video communication session.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for containment of sensitive data within a communication or messaging platform.

The present disclosure will become better understood from the detailed description and the drawings, wherein:

FIG. 5 is a diagram illustrating an exemplary computer that may perform processing in some embodiments.

DETAILED DESCRIPTION

Figure 1A:
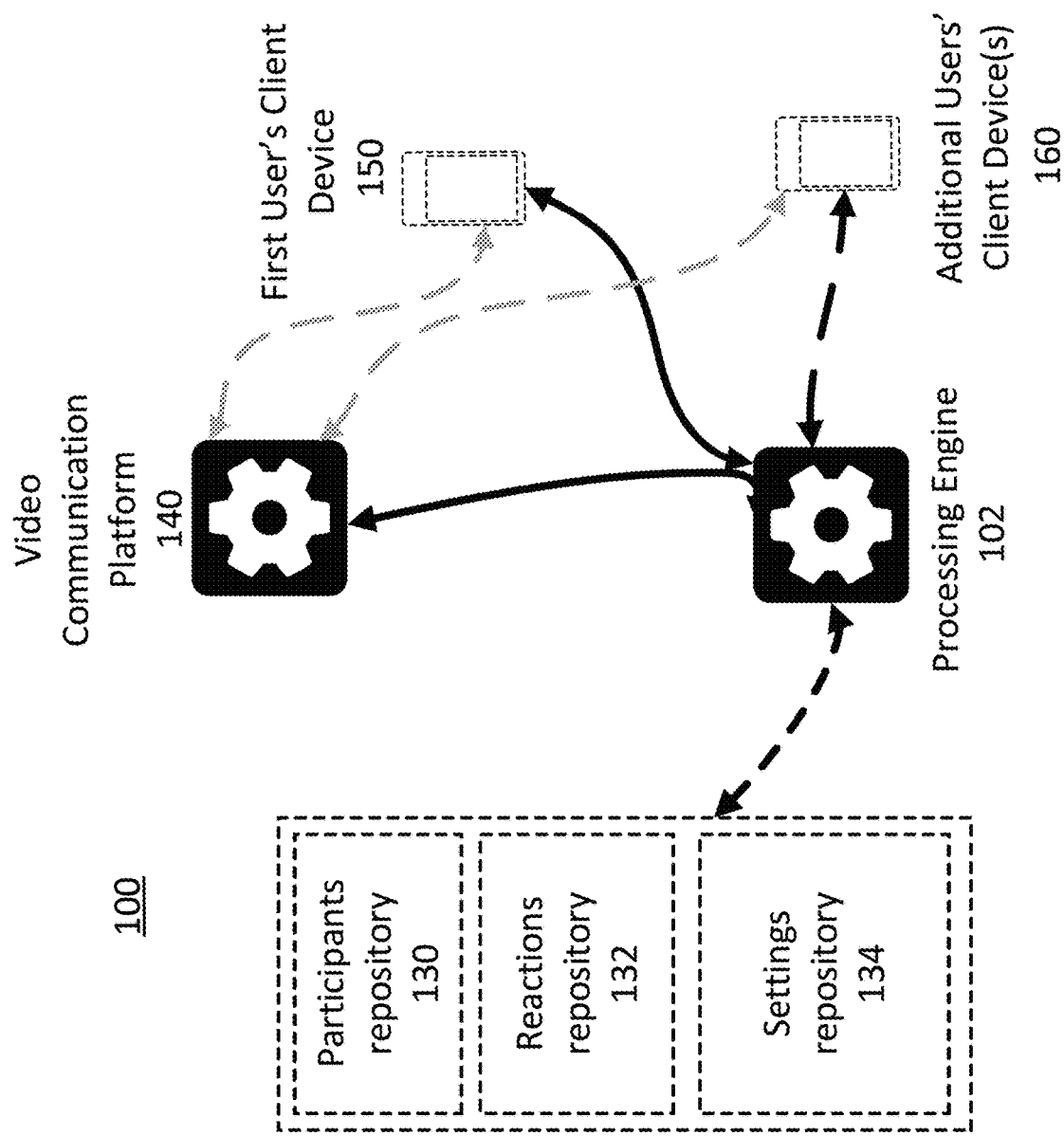
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

By way of illustration, a presenter may be hosting a live webinar on a particular twentieth-century philosopher. The live webinar is hosted within a video communication session of a video communication platform, with the presenter presenting materials and speaking within the virtual room. The participants number in the hundreds. The presenter speaks for an hour while sharing presentation slides, occasionally pausing to take water breaks. The audience of hundreds is silent, as the host has muted all participants other than the speaker. Some participants have their video enabled, but many do not. At times, the speaker makes a joke or lighthearted comment, then pauses for effect.

In previous approaches, the presenter does not receive much in the way of feedback. He is unsure whether his jokes and comments are received well, as he gets no clear, visible reaction from the audience. They may be listening with rapt attention, bored, away from the computer entirely, or laughing, but it is difficult for the presenter to gauge the mood of the room or how his words are being received from moment to moment. As a result, he feels that the remote video session had a "cold" feeling and feels that he lacked real connection with his audience.

In contrast, with the present approach, participants are able to select reactions from within the individual UIs on their devices. The reactions are displayed in their participant windows to other participants. From moment to moment, non-presenting participants can see the reactions of other participants. The presenter has his UI configured such that he does not see individual reactions from participants, which may be visually distracting while he is presenting; instead, he sees aggregate reactions when a number of people in the audience select the same reaction concurrently within a given window of time. Thus, even though non-presenters are muted and many have their video disabled, the presenter occasionally sees an aggregate reaction displayed on his UI when the overall sentiment of the audience sways towards a particular reaction.

For example, upon the presenter sharing a particular anecdote about the philosopher that the audience finds touching, the presenter sees an aggregate reaction of hearts appear within the display during or shortly after the anecdote. When the presenter makes a joke and pauses for effect, he sees an aggregate reaction of laughing faces on his screen, which gives him valuable information that the audience is paying attention on the whole and that his jokes are being received well. In the moment, this encourages the presenter that he has the audience engaged, and causes him to conclude the presentation with a big finish. Through constant visual notification of the audience's reactions in the aggregate, he comes away from the presentation feeling that he connected with his audience and that the presentation went well. The non-presenting audience, in turn, feels that they shared particular sentiments with others in the crowd, and feel more connected having shared their own sentiments. They are able to express laughter or applause without causing disruption of the presentation and without needing to be seen on video. They also received information about individual participants and what reactions they had during various moments of the presentation.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a communication platform 140. The processing engine 102 is connected to the communication platform 140, and optionally connected to one or more repositories and/or databases, including a participants repository 130, reactions repository 132, and/or a settings repository 134. One or more of the databases may be combined or split into multiple databases. The first user's client device 150 and additional users' client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one additional user's client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

Figure 2:
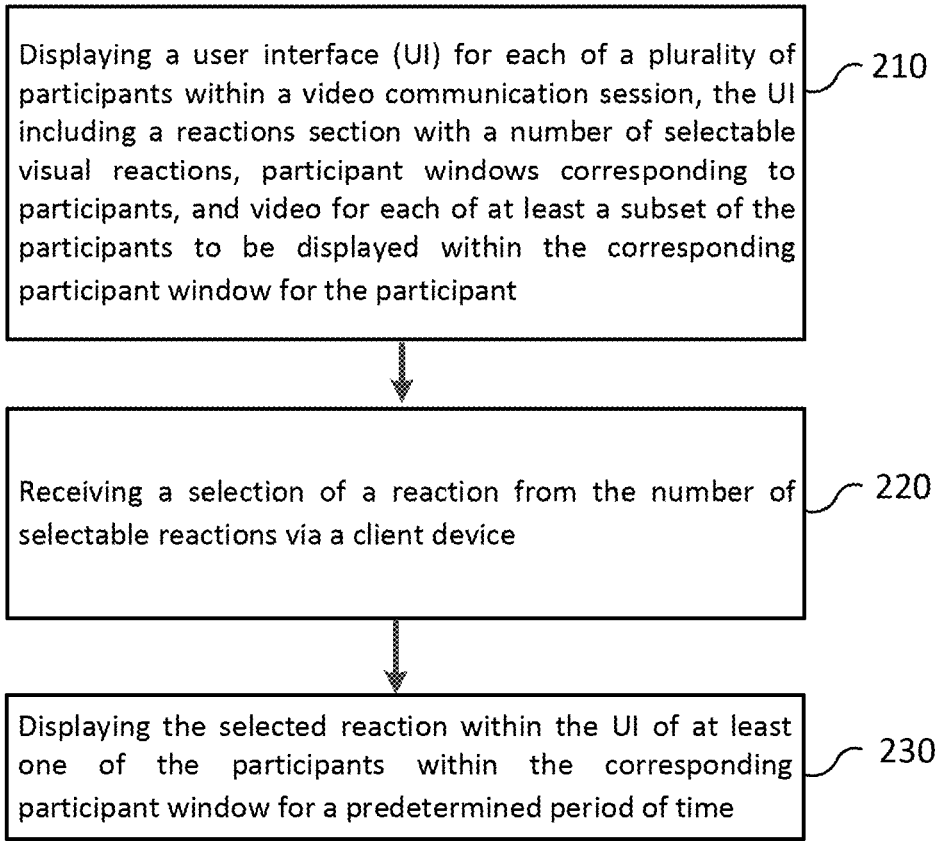
FIG. 2 is a flow chart illustrating an exemplary method that may be performed in some embodiments.
Figure 3:
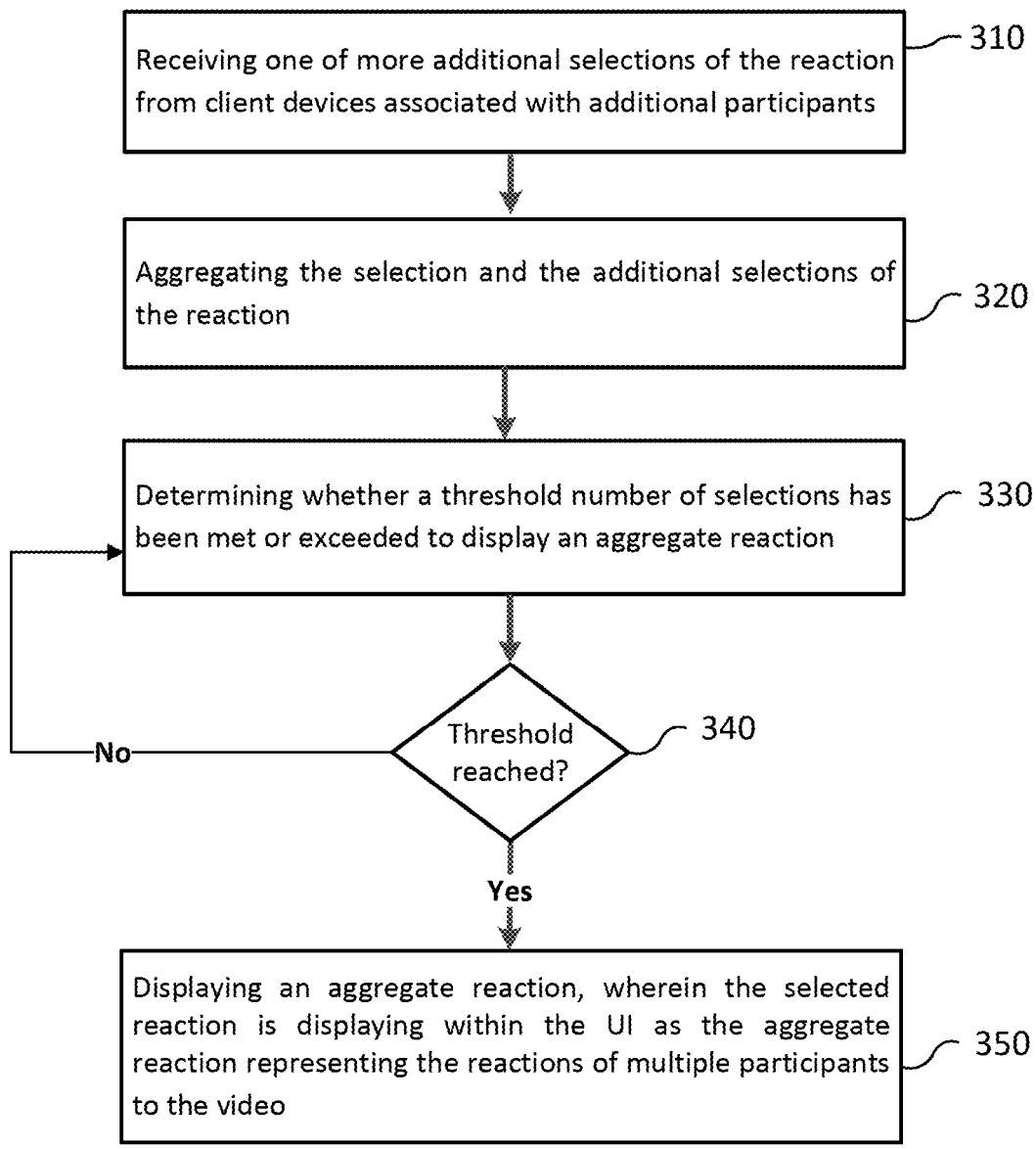
FIG. 3 is a flow chart illustrating an exemplary method that may be performed in some embodiments.

In an embodiment, the processing engine 102 may perform the exemplary method of FIG. 2A, the exemplary method of FIG. 3, or other method herein and, as a result, provide the ability for users to share reactions within a video communication session. In some embodiments, this may be accomplished via communication with the first user's client device, additional users' client device(s), processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The first user's client device 150 and additional users' client device(s) 160 are devices with a display configured to present information to a user of the device. In some embodiments, the client devices present information in the form of a user interface (UI) with multiple selectable UI elements or components. In some embodiments, the client devices 150 and 160 are configured to send and receive signals and/or information to the processing engine 102 and/or communication platform 140. In some embodiments, the client devices are computing devices capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client devices 150 and/or 160. In some embodiments, one or more of the communication platform 140, processing engine 102, and client devices 150 and 160 may be the same device. In some embodiments, the first user's client device 150 is associated with a first user account within a video platform, and the additional users' client device(s) 160 are associated with additional user account(s) within a video platform.

In some embodiments, optional repositories can include one or more of a participants repository 130, reactions repository 132, and/or settings repository 134. The optional repositories function to store and/or maintain, respectively, participant information associated with a video communication session on the communication platform 140, selectable reactions within the video communication session, and settings of the video communication session. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate video communication between two or more parties, such as within a conversation, video conference or meeting, message board or forum, virtual meeting, or other form of digital communication. The video communication session may be one-to-many (e.g., a speaker presenting to multiple attendees), one-to-one (e.g., two friends speaking with one another), or many-to-many (e.g., multiple participants speaking with each other in a group video setting).

Figure 1B:
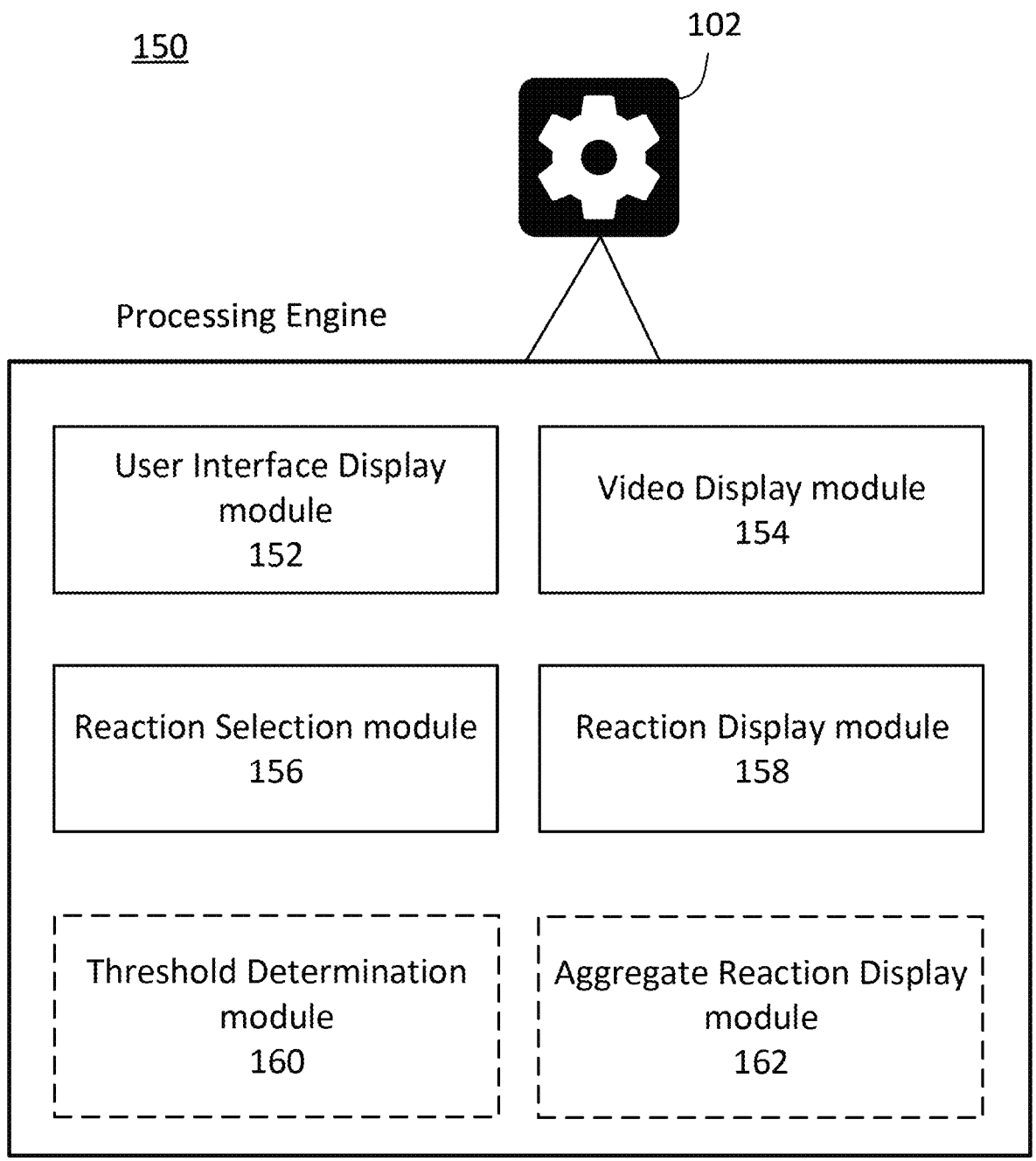
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

User interface display module 152 functions to display a UI for each of the participants within the video communication session, including at least a reactions UI element with selectable reactions, participant windows corresponding to participants, and videos displayed within participant windows.

Video display module 154 functions to display the videos for at least a subset of the participants, which may appear as live video feeds for each participant with video enabled.

Reaction selection module 156 functions to receive, from a client device, a selection of a reaction from the available reactions within the reactions UI element.

Reaction display module 158 functions to display the selected reaction within the UI of at least one of the plurality of participants within the corresponding participant window for a predetermined period of time.

Optional threshold determination module 160 functions to determine that a threshold number of selections of a particular reaction from participants has been met or exceeded.

Aggregate reaction display module 162 functions to aggregate the initial selection and the additional selections of the reaction, and if the threshold has been met or exceeded, functions to display the aggregate reaction within the UI of at least one of the plurality of participants for a predetermined period of time.

The above modules and their functions will be described in further detail in relation to an exemplary method below.

II. Exemplary Method

FIG. 2 is a flow chart illustrating an exemplary method that may be performed in some embodiments.

At step 202, the system displays a user interface for each of a plurality of participants within a video communication session. The UI includes at least: a reactions section with a number of selectable visual reactions; participant windows corresponding to participants; and video for each of at least a subset of the participants to be displayed within the corresponding participant window for the participant.

Figure 4A:
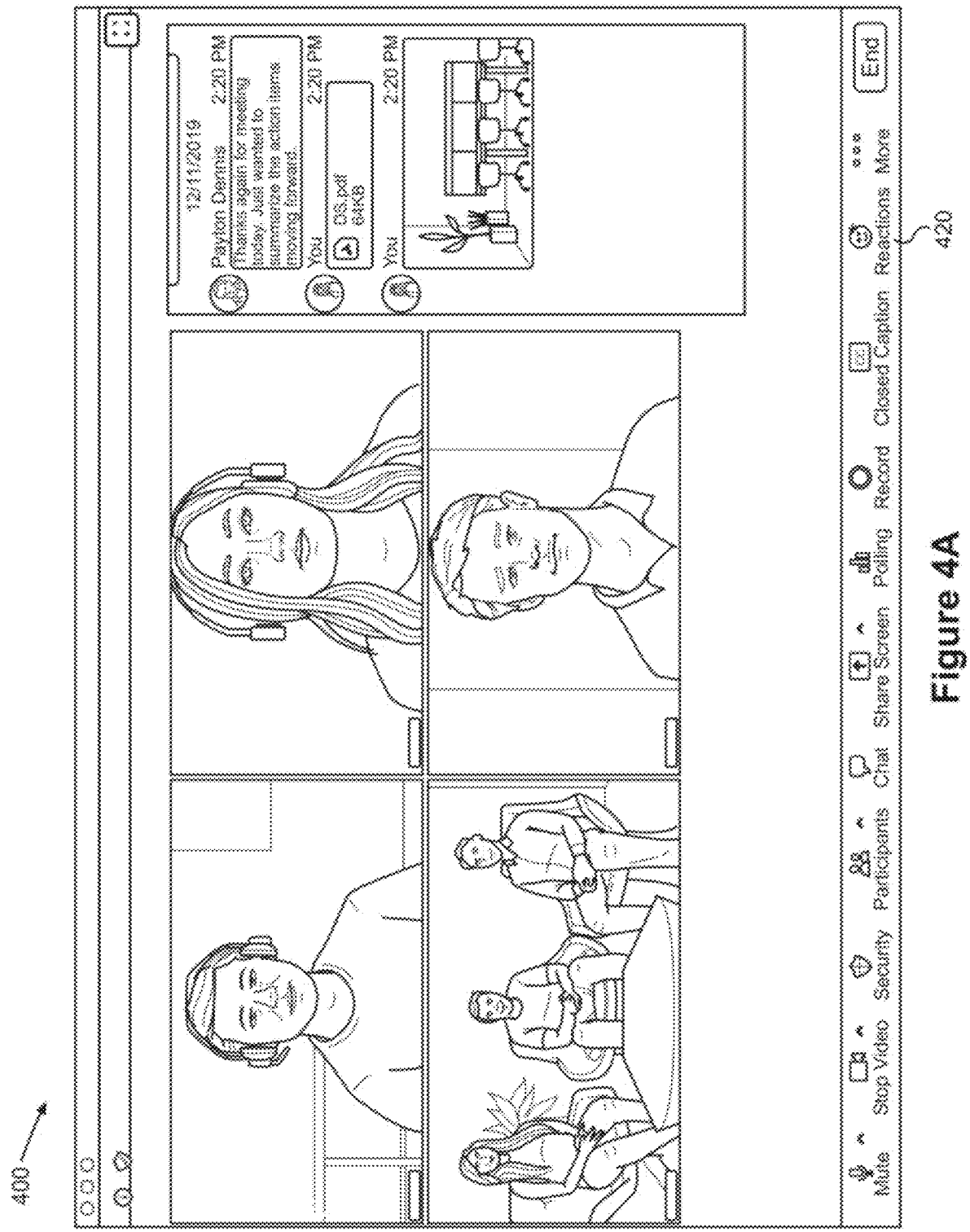
FIG. 4A is a diagram illustrating one example embodiment of a UI within a video communication session, including a selectable reactions UI element.

The UI to be displayed relates to the communication platform 140, and may represent a "video window", such as a window within a GUI that displays a video between a first participant, with a user account within the video platform, and one or more other user accounts within the video platform. The first participant is connected to the video communication session via a client device. The UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session. One example of a communication interface within a communication platform is illustrated in FIG. 4A, which will be described in further detail below.

Figure 4B:
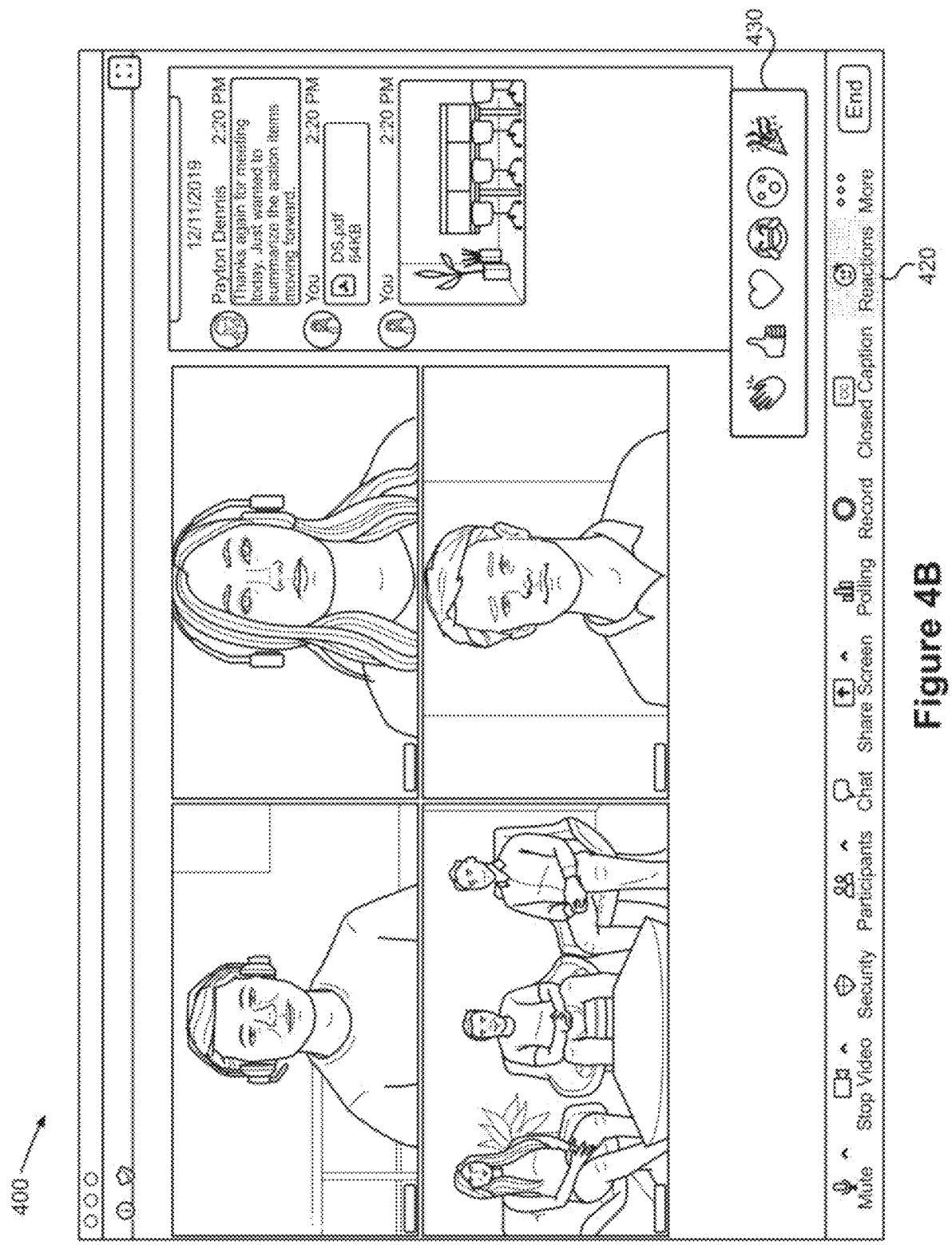
FIG. 4B is a diagram illustrating one example embodiment of a variety of selectable reactions within a video communication session.

One included UI element is a selectable reactions UI element. An example of this secondary UI element is illustrated in FIG. 4B, which will be described in further detail below. Examples of selectable reactions may include, e.g., clapping hands, a raised hand, a thumbs up symbol indicating approval, a thumbs down symbol indicating disapproval, a heart symbol, a laughing face, a surprised face, a party symbol (e.g., a party horn and confetti), a smiling face, a frowning face, a crying face, or any other suitable visual reaction. In some embodiments, a subset or the full set of reactions may be emojis. In some embodiments, emojis may be standard Unicode emoji characters and/or sequences, or other universal or standardized emojis. In some embodiments, emojis may be non-standard emojis. In some embodiments, reactions may be animated. For example, they may be in animated GIF format or any other format which allows animated images to appear on the screen. In some embodiments, reactions may be static images. In some embodiments, reactions may be audio segments or clips rather than visual reactions. In some embodiments, reactions may be drawings generated by participants via a touch, pen, or stylus input.

In some embodiments, one or more of the selectable reactions may be provided by a participant within the video session or a third party. In some embodiments, selectable reactions are extensible, and may be submitted or uploading by users of the video platform. For example, the platform may be configured to allow different emoji providers to add their own emoji-based "sticker packs", which can be chosen by a participant and then incorporated into the set of available visual reactions for that participant during the video communication session. In some embodiments, users may be able to upload their own reactions. In some embodiments, users may be able to purchase premium reactions or download free reactions from a separate online store interface.

In some embodiments, there may be a different set or multiple sets of reactions depending on the video session in question, whether the video session may be categorized or tagged as, e.g., a formal business meeting or an information get-together between friends, etc. In one informal video session, a particularly fun or silly set of reactions may be available, while in a formal session with potential business investors, the reactions may be less silly and more appropriate for a business setting. In some embodiments, participants, administrators, hosts, and/or owners of corporate accounts can have the ability to configure which set or sets of reactions are to be selectable for a given video session.

Another portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). The participant windows are also configured to display reactions from the participant in question, as will be discussed in further detail below. Some participant windows may not contain any video, for example, if a participant has disabled video or does not have a connected video camera device (e.g. a built-in camera within a computer or smartphone, or an external camera device connected to a computer).

The videos displayed for at least a subset of the participants appear within each participant's corresponding participant window. Video may be, e.g., a live feed which is streamed from the participant's client device to the video communication session. In some embodiments, the system receives video content depicting imagery of the participant, with the video content having multiple video frames. The system provides functionality for a participant to capture and display video imagery to other participants. For example, the system may receive a video stream from a built-in camera of a laptop computer, with the video stream depicting imagery of the participant.

At step 220, the system receives, from a client device, a selection of a reaction from the number of selectable reactions within the reactions UI element. The client device in question may be, e.g., the first user's client device 150, where the first user is a participant of the video session who selected the reaction from the reactions UI element. In some embodiments, the reactions UI element may be selected by a participant by, e.g., clicking or holding down a mouse button or other component of an input device, tapping or holding down on the UI element with a finger, stylus, or pen, hovering over the UI element with a mouse or other input device, or any other suitable form of selecting a UI element. In some embodiments, upon selecting the UI element, a sub window or other secondary UI element appears which displays a variety of selectable visual reactions. Upon selecting the desired visual reaction, the selection is sent to the system (e.g., the processing engine 102) to be processed.

In some embodiments, the selection may be performed at the client device by one or more participant gestures or expressions. For example, the system may be configured such that the user can use sign language gestures to select reactions, or basic gestures such as a thumbs up. In some embodiments, the camera captures the gesture, analyzes it and classifies as the gesture in question, and then selects the appropriate reaction in response. In some embodiments, expressions may be used instead of gestures. For example, when a participant smiles, the camera captures the participant smiling, analyzes the image, classifies it as a smile, then selects the appropriate smiling face reaction in response. In some embodiments, the participant's gesture may be clapping his or her hands. The clapping may be detected by the camera, by the audio capture device, or both. For example, when one person claps, the system may interpret the audio as clapping and automatically select a clapping reaction for the participant who is clapping. In some embodiments, multiple people clapping may trigger an aggregate reaction. Aggregate reactions will be described in further detail below with respect to FIG. 3 and the accompanying description.

Figure 4C:
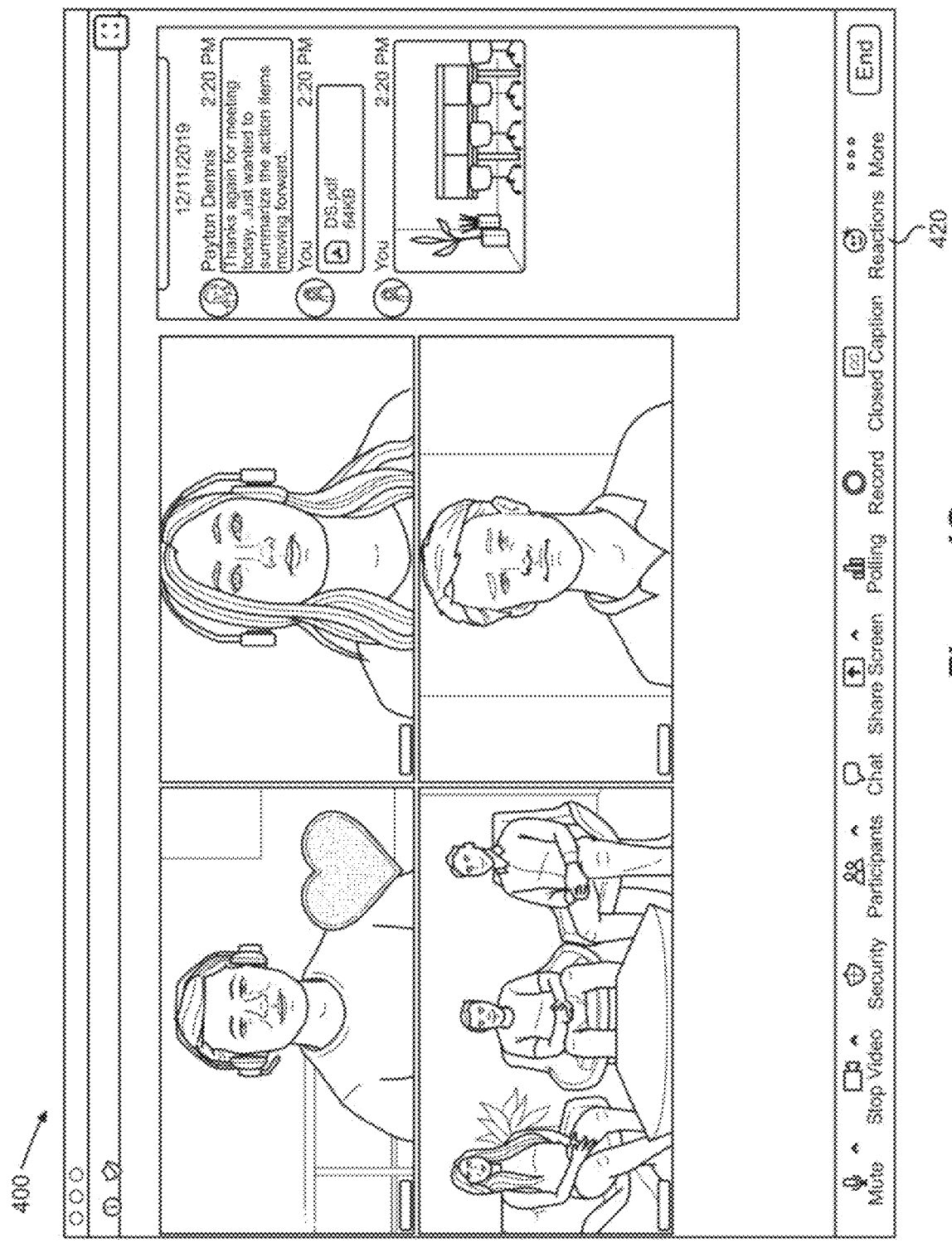
FIG. 4C is a diagram illustrating one example embodiment of a reaction from a participant being displayed within a video communication session.

At step 230, the system displays the selected reaction within the UI of at least one of the participants within the corresponding participant window for a predetermined period of time. In some embodiments, the selected reaction is displayed within the participant window corresponding to the participant who selected the reaction. For example, if Participant 1 selects a clapping hands reaction, then a clapping hands reaction will appear in the participant window for Participant 1. In some embodiments, the reaction is visible in a portion of the participant window, e.g., the lower right corner. In some embodiments, the reaction may be static, while in others, the reaction may be animated. One example of a selected reaction being displayed within a UI is illustrated in FIG. 4C, which will be described in further detail below.

In some embodiments, the reaction is visible to all participants whose UI is currently showing the participant window of the participant who selected the UI reaction. In some embodiments, the reaction is visible to all participants regardless of whether the appropriate participant window is visible on the UI. For example, some participants may see a clapping hands reaction appear from one corner of the UI, or in some specific section of the UI. In some embodiments, the reaction may have the participant's name or username attached to it. The name or username may be visible immediately, visible upon clicking on the reaction, or visible upon an input device hovering over the reaction.

In some embodiments, an administrator, host, or settings coordinator for the video communication session may have disabled reactions from being displayed for some or all participants. In some embodiments, this may lead to the reaction not being displayed despite a participants selecting a reaction. In other embodiments, the participants will not be able to select the reactions UI element as it is greyed out or otherwise disabled. In some embodiments, participants themselves may have the option to disable reactions within their own UI. This may be useful for participants who find the reactions to be distracting, for example.

The amount of time in which the reaction is displayed within a given participant window is predetermined. In some embodiments, the time is predetermined based on a default time setting. For example, all reactions may appear displayed for five seconds by default before disappearing. In some embodiments, this default time window may be altered by an administrator, host, or owner of a corporate account in a separate settings or preferences user interface. In some embodiments, the amount of time a share reaction is displayed (i.e., reaction period time) may be dynamically determined based on one or more factors or criteria. Factors may include, for example, whether the participant who submitted the reaction is muted or speaking; whether other participants are muted or speaking; whether the participant who submitted the reaction has video enabled or disabled; whether there's a pause or moment of silence in the audio; whether the reaction was selected by a momentary click or tap, or an input indicating a longer interaction, such as holding a mouse button, a long press of a finger on a touch screen, or similar; whether an individual participant has indicated a preference for longer or shorter times for reactions to be displayed; the number of participants; the number of concurrently displayed reactions; a determined engagement level of the participants; or any other suitable factor for dynamically determining the time a reaction is displayed within the participant window.

Figure 4D:
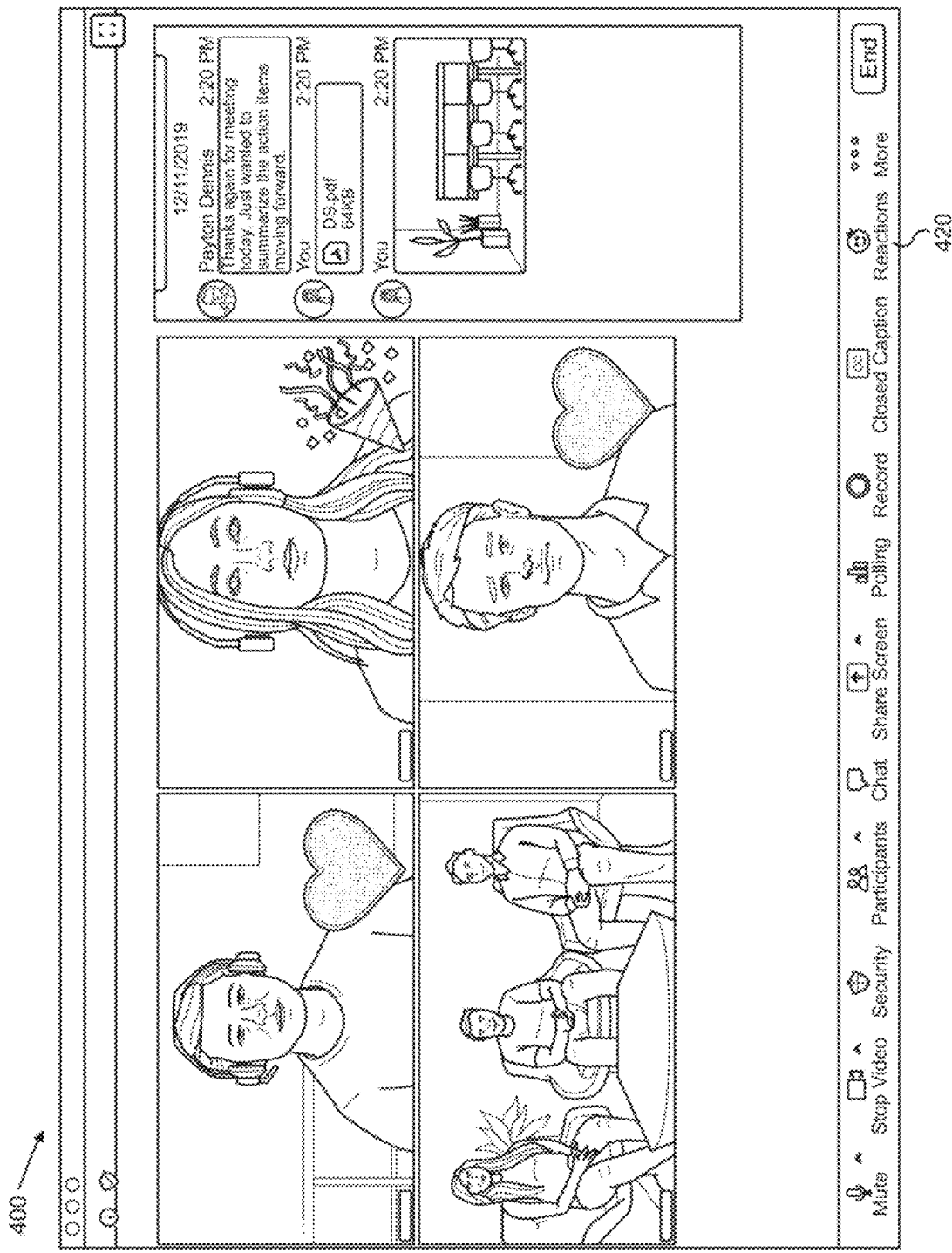
FIG. 4D is a diagram illustrating one example embodiment of reactions from multiple participants being displayed concurrently within a video communication session.

In some embodiments, a selected reaction may be displayed within a given participant window while one or more other reactions are displayed in other participant windows. Participants may select reactions to be displayed in real time or substantially real time independently of other participants selecting reactions. One example of such simultaneous or concurrent display of multiple reaction is illustrated in FIG. 4D, which will be described in further detail below.

In some embodiments, while a participant is presenting materials or speaking at length in a video session, the presenter may be specially alerted or notified if one or more participants selects a "raised hand" or other reaction indicating that the user has a question or is requesting to comment. This can be benefit teachers, webinar hosts, and others who want to be notified when participants have questions or comments or otherwise want to participate in some active way during a presentation. In some embodiments, the presenter may have the option to turn this alert or notification on or off within the presenter's settings or preference for the video session. The alert or notification may be visual, audio-based, or both, or may be, e.g., a push notification on a separate mobile device associated with the presenter.

FIG. 3 is a flow chart illustrating an optional exemplary method that may be performed in some embodiments. In some embodiments, the optional exemplary method begins at the point where FIG. 2, step 230 ends, i.e., after the system displays the selected reaction within one or more participant UIs. In other embodiments, the optional exemplary method begins at the end of FIG. 2, step 220, and step 230 is skipped. In yet other embodiments, at least part of the exemplary method is performed concurrently to one or more steps of FIG. 2.

At optional step 310, the system receives one or more additional selections of the reaction from client devices associated with additional participants. For example, in some embodiments, the system receives the additional selections of reactions from participants while the system also receives the initial selection from the participant in FIG. 2. Each participants may send an additional selection of the reaction from their own UI by navigating to the reactions UI element and selecting the reaction in question. Thus, for example, while the first participant selects a heart emoji, other participants may be simultaneously selecting heart emojis as well via the reactions UI element in their own UIs.

At optional step 320, the system aggregates the selection and the additional selections of the reaction. In some embodiments, this aggregation may be performed by adding the initial selection of the reaction with the number of additional selections of the reaction. For example, if there are 7 additional heart reactions, then the system aggregates the reactions by adding 7+1 for the first selected reaction to obtain 8 heart reactions. In some embodiments, the aggregation continues for a predetermined period of time, then resets after that time has passed. For example, the system may aggregate heart reactions which have been selected over a 10 second period of time, then reset to 0 after the 10 seconds has passed. In some embodiments, there is a predetermined time window for which aggregations are totaled. For example, for any given 10 second window, reactions are aggregated within that window. The window is constantly shifting, and any reactions which were selected outside of the 10 second window are de-aggregated.

At optional step 330, the system determines that a threshold number of selections has been met or exceeded to display an aggregate reaction. The number of selections is indicated by the aggregation of reactions in step 320. In some embodiments, the threshold is predetermined as a set number. For example, one embodiment may have a threshold set to 10 for a video communication session. Upon 10 participants concurrently selecting the same reaction (e.g., a heart reaction) in the video communication session, the threshold is exceeded. In some embodiments, the threshold may be set by an administrator, host, or owner of a corporate account. In some embodiments, the threshold may be dynamically determined based on one or more factor. Factors may include, e.g., the number of participants in the session; the number of participants in the session who are actively participating (e.g., speaking regularly or semi-regularly throughout the session); or any other suitable factor.

In some embodiments, the threshold determines whether the video communication session is classified as a large scale group meeting (or "large group meeting"). Large group meetings—such as one-to-many video sessions or many-to-many video sessions with several participants—can be configured to have specific settings for reactions, among other aspects of the session experience. In some embodiments, large group meetings may be configured to have specific predetermined thresholds for aggregate reactions. In some embodiments, they may also have aggregate reactions enabled by default, whereas non-large group meetings may have aggregate reactions disabled by default.

In some embodiments, when the video session is determined to be a large group meeting, the video communication session's settings are configured or reconfigured such that aggregate reactions are to be displayed instead of non-aggregate reactions from individual participants. That is, rather than displaying all individual reactions from group participants, which may present clutter, confusion, and too much on-screen movement and change in a session with many participants, only aggregate reactions are displayed to give an overall feeling or sentiment of the group as a whole.

In some embodiments, the threshold is determined to have been met or exceeded when a determined engagement level of the participants crosses a certain threshold. Engagement level may be determined dynamically based on, for example, the amount of active speakers or presenters within the session, the amount of participants with video enabled, the amount of participants who are selecting reactions during the session, audio analysis which determines the participants are laughing as a group or clapping as a group, or any other suitable factor.

At optional decision point 340, if the threshold has not been reached (i.e., met or exceeded), then the system continues to determine at step 330 whether the threshold has been reached while participants continue with the video session. If the threshold has been reached, then the system proceeds to optional step 350.

Figure 4E:
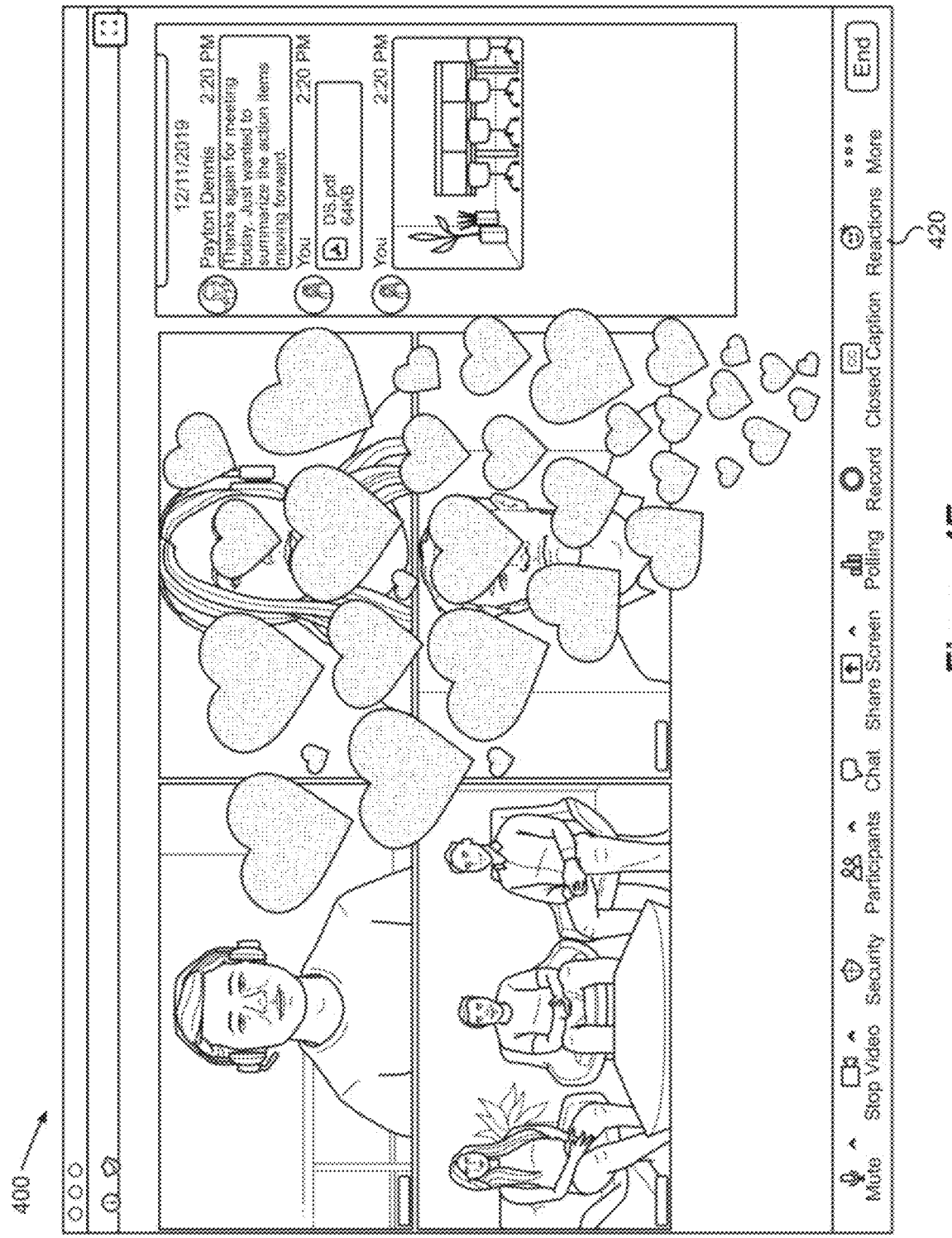
FIG. 4E is a diagram illustrating one example embodiment of an aggregated reaction from many participants being displayed within a video communication session.

At optional step 350, the system displays an aggregate reaction. The selected reaction displays within the UI of one or more participants as an aggregate reaction. The aggregate reaction represents the reactions of multiple participants in the video. In some embodiments, the aggregate reaction appears as several iterations of the selected reaction displayed within the UI. These iterations may appear in participant windows, outside of participant windows, or both inside and outside of participant windows. In some embodiments, the system displays an animated version of the shared reaction. In some embodiments, the system displays a larger version of the shared reaction on the screen. Many other possibilities for displaying aggregate reactions may be contemplated. In some embodiments, the aggregate reaction is displayed on the screen for a longer time than individual reactions are displayed. One example of an aggregate reaction being displayed within a UI is illustrated in FIG. 4E, which will be described in further detail below.

In some embodiments, if there are one or more presenters within a video communication session, i.e., participants who are primary speakers, who may be presenting materials and/or sharing their screen, or otherwise acting as the primary participant of the session, then the system may configure the UI of that presenter to only display aggregate reactions rather than individual reactions, while the UIs of other participants are configured to display non-aggregate, individual reactions. In this way, the presenter may see only the overall sentiment or feeling of the room at a glance without being distracted, while other participants see individual reactions.

FIGS. 4A-4G are diagrams illustrating various aspects of the systems and methods herein through different example embodiments.

FIG. 4A is a diagram illustrating one example embodiment of a UI within a video communication session, including a selectable reactions UI element.

User interface 400 depicts a UI that a particular participant is viewing on a screen of the participant's client device. For purposes of the example embodiments of FIGS. 4A-4E, the UI belongs to the participant in the top left corner. Four participant windows are displayed within the UI, arranged in a 4×4 grid. Within each participant window is a video. The video in each of the participant windows is a live video feed captured via a camera or other device that is either built into or connected to the client device of that participant, then streamed to the UIs of participants. Also appearing in the bottom left corner of each participant window is a name of the participant, as well as an icon indicating that the participant has their audio muted, if applicable. In the top right, a selectable UI element allows a participant to toggle between a full screen view and non-full-screen view. To the right, a chat or messaging section of the UI provides participants to enter messages to be displayed while the video communication session proceeds.

A bar at the bottom of the UI present a number of selectable UI elements within the UI. These elements include Mute, Stop Video, Security, Participants, Chat, Share Screen, Polling, Record, Closed Caption, Reactions, More, and End. The Reactions UI element 420 is selectable by a participants through an input device, i.e., a user clicking on the UI element while a mouse pointer is pointed at the UI element.

FIG. 4B is a diagram illustrating one example embodiment of a variety of selectable reactions within a video communication session.

FIG. 4B is identical to FIG. 4A, except the participant has selected the Reactions UI element 420. A sub element or submenu 430 appears after the participant selects the UI element. The sub element 430 appears in the space directly above the Reactions UI element 420. The sub element 430 displays a variety of selectable reactions, including a clapping hand reaction, a thumbs up reaction, a heart reaction, a laughing face reaction, a surprised face reaction, and a party reaction. A participant may navigate the input device to one of the selectable reactions and select it with the input device.

FIG. 4C is a diagram illustrating one example embodiment of a reaction from a participant being displayed within a video communication session.

FIG. 4C is identical to FIG. 4B, except the participant has selected a heart reaction from the sub element 430. The sub element 430 disappears, and the selected reaction is displayed in the lower right corner of the participant's UI. In this case, since the user interface 400 belongs to the participant in the top left participant window, when the participant selected the heart reaction, it appeared in the participant's own visible participant window. In some embodiments, if the participant has selected to not view video of himself or herself, then the selected reaction may still be briefly shown in some portion of the UI to indicate that the reaction was successfully displayed to other participants.

FIG. 4D is a diagram illustrating one example embodiment of reactions from multiple participants being displayed concurrently within a video communication session.

FIG. 4D is identical to FIG. 4C, except multiple participants have selected reactions to be displayed, not just the participant in the top left. Thus, two participant windows display heart reactions, while one participant window displays a party reaction. In some embodiments, multiple reactions can be displayed concurrently and independently of each other. In some embodiments, such individual reactions may be concurrently and independently displayed, even in a session with many participants. For example, even a session filled with 500 or more participants may be configured to display individual reactions of participants.

FIG. 4E is a diagram illustrating one example embodiment of an aggregated reaction from many participants being displayed within a video communication session.

FIG. 4E is identical to FIG. 4C, except multiple participants have selected the same reaction. The reaction has been aggregated to a total of 4, which crosses a predetermined threshold for displaying an aggregate reaction. For example, the default threshold for the session may be three-fourths of participants. At the point three out of four participants select the heart reaction within a predetermined window of time, e.g. 10 seconds, the threshold is reached and the aggregate reaction is displayed.

Within the example embodiment, the aggregate reaction is displayed as a number of heart reaction images which move or float across the screen. This indicates that enough participants in the session have reacted in the same way that the overall sentiment or mood of the room can be captured by the heart reaction. The aggregate reaction does not display in any one participant window, but rather is displayed both inside and outside of participant windows, across the UI. Many other styles of aggregate reactions can be displayed based on preferences and needs. In some embodiments, an administrator, host, or owner of a corporate account can configure the settings and preference for the video communication session to select a particular style of aggregate reactions, or to turn off aggregate reactions entirely.

Figure 4F:
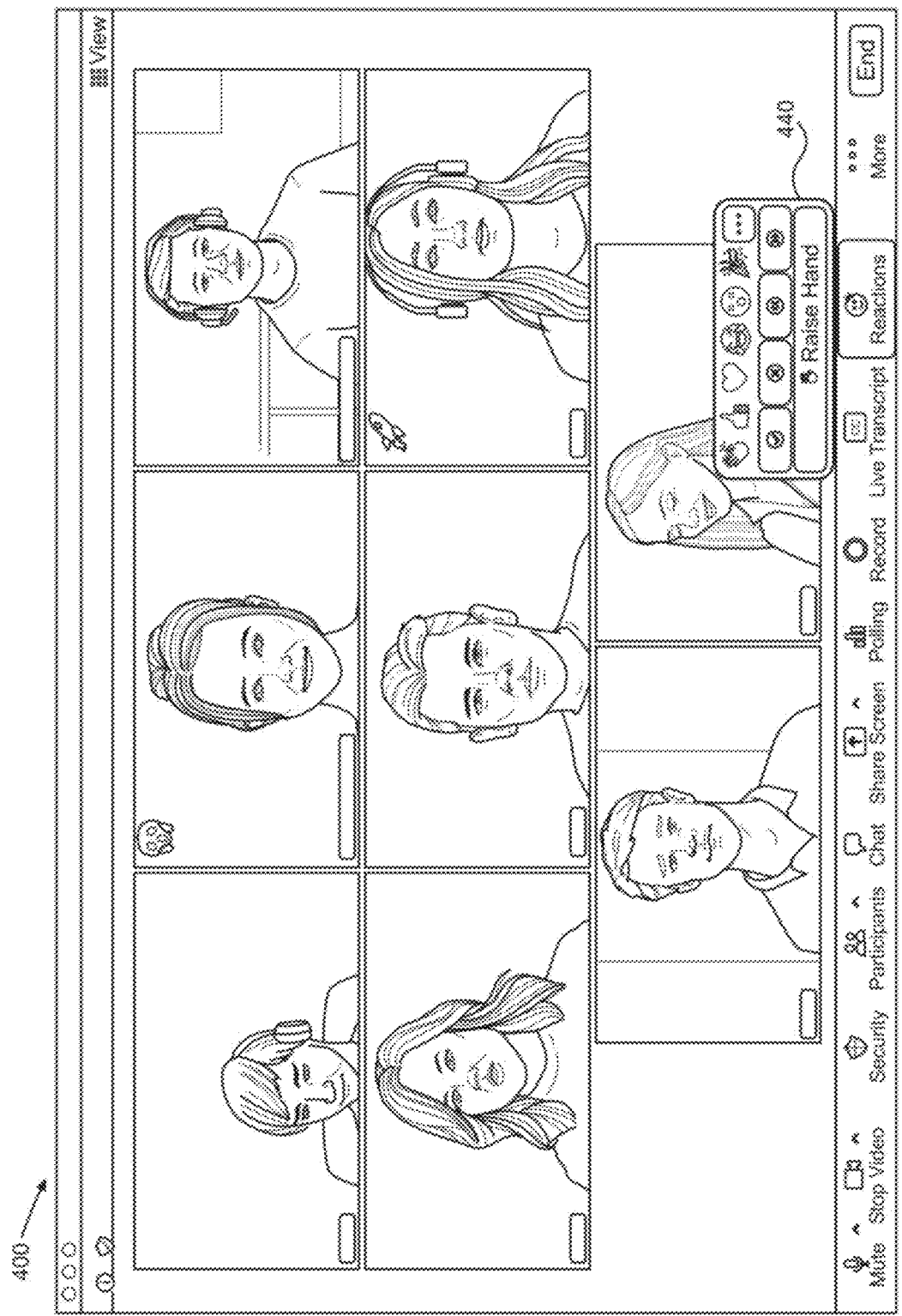
FIG. 4F is a diagram illustrating one example embodiment of additional selectable reactions displayed within a video communication session.

FIG. 4F is a diagram illustrating one example embodiment of additional selectable reactions displayed within a video communication session.

FIG. 4F is identical to FIG. 4B, except that the variety of selectable reactions 430 displayed within FIG. 4B has been expanded to a larger variety of selectable reactions 440. In addition to the six selectable reactions illustrated in FIG. 4B, there are a number of additional reactions and UI elements which can be selected. There is also a selectable ellipses (" . . . ") UI element. Upon clicking on the ellipses UI element, a further expanded submenu of selectable reactions can be displayed, as will be illustrated in FIG. 4G.

Figure 4G:
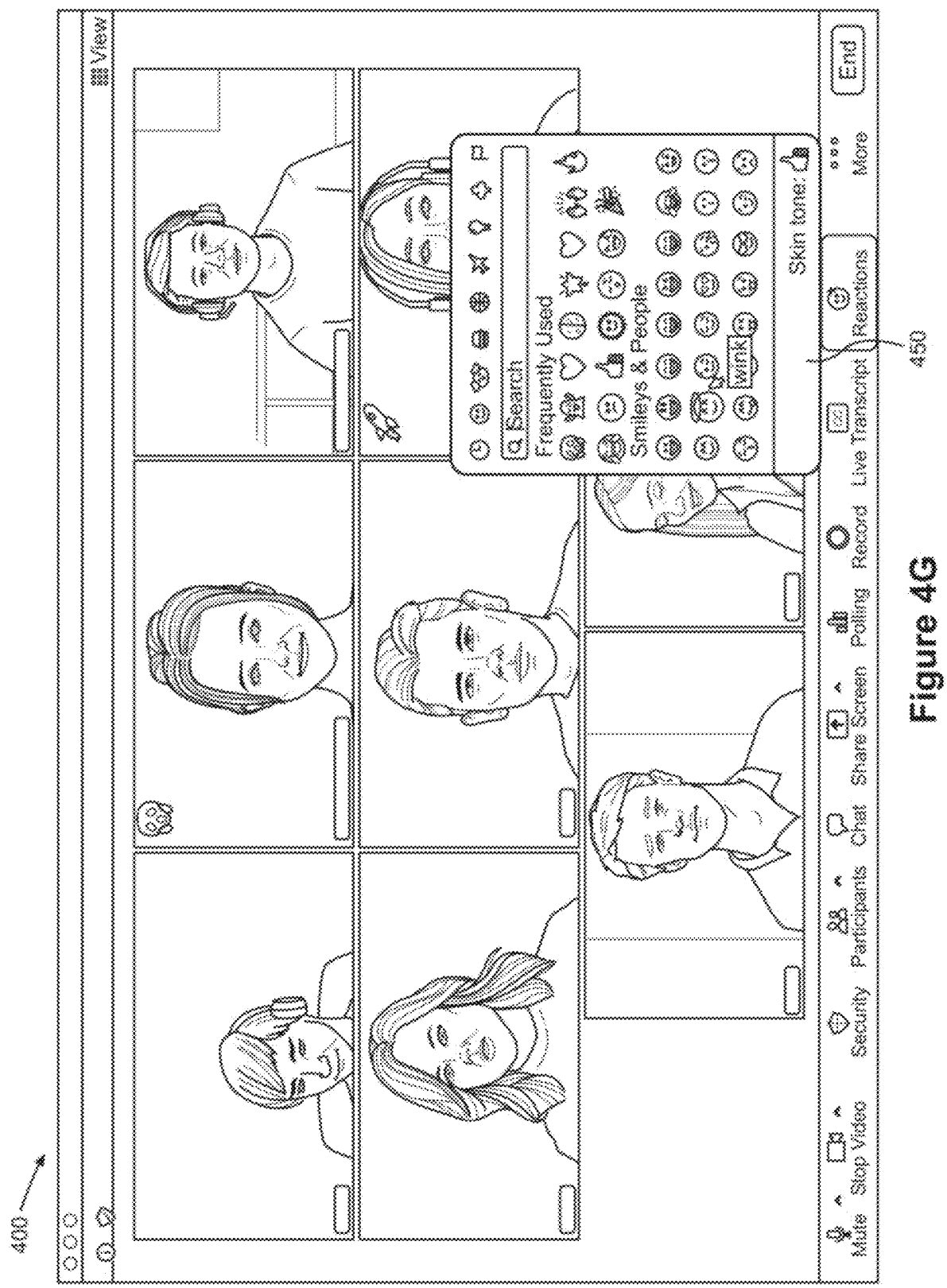
FIG. 4G is a diagram illustrating one example embodiment of an expanded submenu of selectable reactions displayed within a video communication session.

FIG. 4G is a diagram illustrating one example embodiment of an expanded submenu of selectable reactions displayed within a video communication session.

Upon clicking on the ellipses UI element in FIG. 4F, an expanded submenu of selectable reactions 450 is displayed. In some embodiments, the submenu includes a search field UI element which allows a user to enter characters or words to search for the selectable reaction they would like to use. In the example illustrated, a full set of emojis is selectable within the expanded submenu, separated into categories such as "Smileys & People"). In some embodiments, the user may also select one of a variety of skin tones for some of the selectable reactions, such as reactions that depict faces or hands.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A communication system comprising one or more processors configured to perform the operations of:
   displaying, for each of a plurality of participants within a video communication session, a user interface (UI), the UI comprising:
   a reactions section comprising a plurality of selectable visual reactions, a plurality of participant windows corresponding to the plurality of participants in the video communication session, wherein each participant is connected to the video communication session via a client device, and
   a video for each of at least a subset of the participants, wherein the video is displayed within the corresponding participant window for the participant;
   receiving a selection of a reaction from the plurality of reactions via a client device connected to the video communication session, wherein the client device is associated with a participant from the plurality of participants;
   receiving one or more additional selections of the reaction from client devices associated with additional participants from the plurality of participants;
   determining an aggregate reaction based on the selection of the reaction and the one or more additional selections, the determining comprising:
   for a predetermined period of time, aggregating reactions received from the plurality of client devices; and
   selecting a group display reaction where the number of aggregated reactions meets or exceeds a predetermined threshold value, the predetermined threshold value being dynamically determined based on a number of the plurality of participants that are active participants; and
   providing for display the group display reaction for the UI of at least one of the plurality of participants within the corresponding participant window for a predetermined period of time, the group display reaction comprising multiple graphical icons of the same type.

2. The system of claim 1, further comprising:
   determining that the plurality of participants within the video communication session meets or exceeds a threshold number of participants to be classified as a large scale group meeting; and
   classifying the video communication session as a large scale group meeting such that the aggregate reaction is to be displayed instead of non-aggregate reactions from individual participants.

3. The system of claim 1, wherein the received selection of the reaction is displayed within the UI of one or more presenting participants within the video communication session as an aggregate reaction, and
   wherein the received selection of the reaction is displayed within the UI of one or more non-presenting participants within the video communication session as a plurality of non-aggregate reactions.

4. The system of claim 1, wherein the selected reaction is displayed in an animated fashion.

5. The system of claim 1, wherein the selectable reactions comprise one or more of: an animated GIF, a static image, an audio segment, and/or a drawing generated via a touch, pen, or stylus input.

6. The system of claim 1, wherein the selected reaction visually indicates that the participant is requesting to comment or ask a question.

7. The system of claim 1, wherein the predetermined period of time has been configured by an administrator or host of the video communication session.

8. The system of claim 1, wherein an administrator or host of the video communication session has enabled, via a settings interface, the ability for reactions to be displayed within the UIs of participants.

9. The system of claim 1, wherein each of one or more of the participants within the video communication session has enabled, via a settings interface, the ability for reactions to be displayed within the UI for that participant.

10. The system of claim 1, wherein the selection of the reaction from the client device is generated from one or more participant gestures captured at the client device.

11. The system of claim 1, wherein a plurality of reactions are displayed simultaneously within a plurality of participant windows.

12. The system of claim 1, wherein the plurality of selectable reactions in the reactions section is an extensible set of reactions comprising one or more reactions sourced from one or more reaction providers.

13. The system of claim 1, wherein the reaction criteria comprise one or more of: number of participants, number of concurrently displayed reactions, and/or a determined engagement level of the participants.

14. A method for displaying reactions within a video communication session, comprising:
    displaying, for a plurality of participants within a video communication session, a video and a user interface (UI), the UI comprising:
    a reactions section comprising a plurality of selectable visual reactions to the video, and a plurality of participant windows corresponding to the plurality of participants in the video communication session, wherein each participant is connected to the video communication session via a client device;
    receiving a selection of a reaction from the plurality of reactions via a client device connected to the video communication session, wherein the client device is associated with a participant from the plurality of participants;
    receiving one or more additional selections of the reaction from client devices associated with additional participants from the plurality of participants;
    determining an aggregate reaction based on the selection of the reaction and the one or more additional selections, the determining comprising:
        for a predetermined period of time, aggregating reactions received from the plurality of client devices; and
        selecting a group display reaction where the number of aggregated reactions meets or exceeds a predetermined threshold value, the predetermined threshold value being dynamically determined based on a number of the plurality of participants that are active participants; and
    providing for display the group display reaction for the UI of at least one of the plurality of participants for a predetermined period of time, the group display reaction comprising multiple graphical icons of the same type.

15. The method of claim 14, wherein the selected reaction is displayed within a participant window from the plurality of participant windows, wherein the participant window corresponds to the participant.

16. The method of claim 14, wherein the plurality of selectable reactions in the reactions section is an extensible set of reactions comprising one or more reactions sourced from one or more reaction providers.

17. The method of claim 14, wherein the predefined period of time is dynamically determined based on one or more reaction period criteria.

18. The method of claim 14, wherein the UI of the at least one of the plurality of participants is configured to display the group display reaction and not an individual reaction based on the selection of the reaction or the one or more additional selections.

19. The method of claim 14, wherein the UI of the at least one of the plurality of participants is configured to display the group display reaction for a longer time than a reaction for the selection of the reaction or the one or more additional selections.

20. The method of claim 14, wherein the UI of the at least one of the plurality of participants is configured to display the group display reaction both inside and outside of the plurality of participant windows, and display an individual reaction based on the selection of the reaction or the one or more additional selections within a participant window associated with a participant initiating the individual reaction.

* * * * *